No. 648,857. Patented May 1, 1900.
C. D. DESHLER.
FILTER CLEANER.
(Application filed Oct. 17, 1899.)
(No Model.)
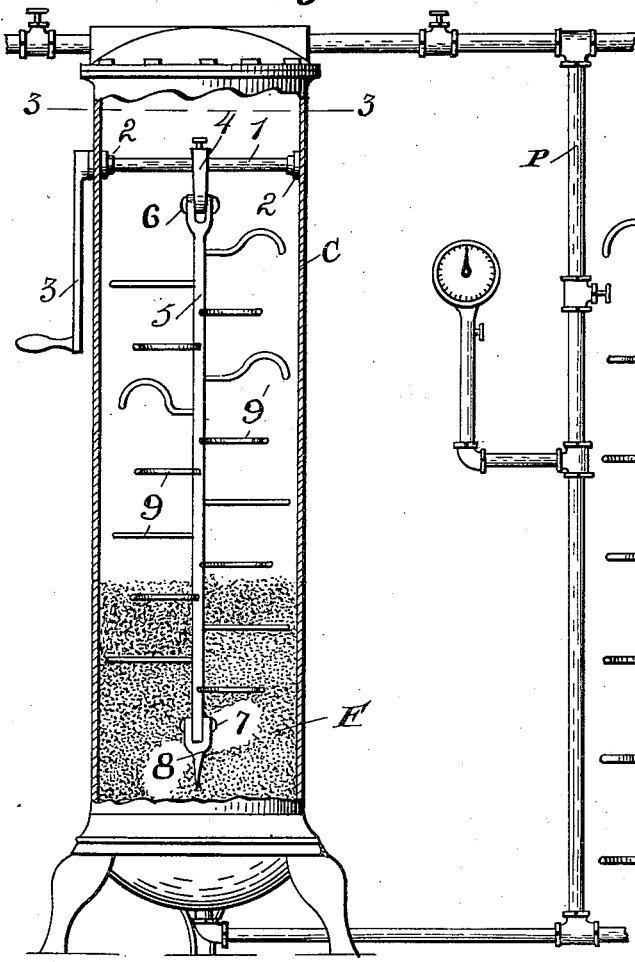
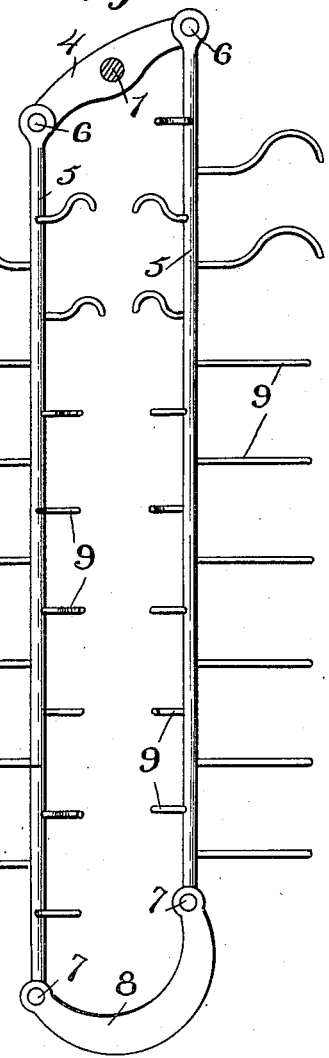
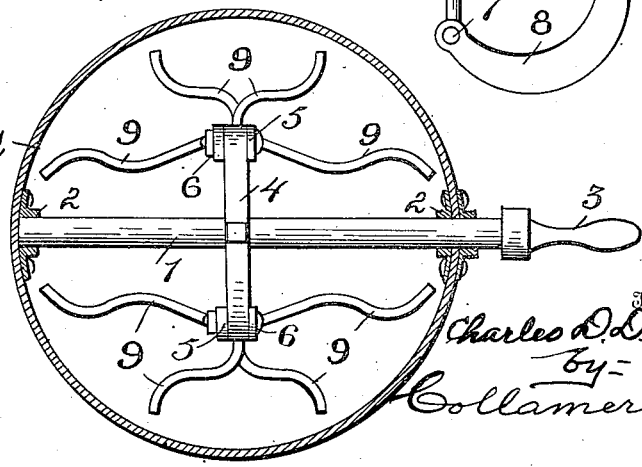
Witnesses
Geo. E. Frech.
R. P. Herrick.
Inventor
Charles D. Deshler,
by
Collamer & Co.
Attorneys

UNITED STATES PATENT OFFICE.

CHARLES D. DESHLER, OF ALLENTOWN, PENNSYLVANIA, ASSIGNOR OF ONE-HALF TO FRANK K. MOYER, OF SAME PLACE.

FILTER-CLEANER.

SPECIFICATION forming part of Letters Patent No. 648,857, dated May 1, 1900.

Application filed October 17, 1899. Serial No. 733,921. (No model.)

*To all whom it may concern:*

Be it known that I, CHARLES D. DESHLER, a citizen of the United States, residing at Allentown, in the county of Lehigh and State of Pennsylvania, have invented certain new and useful Improvements in Filter-Cleaners; and I do hereby declare the following to be a full, clear, and exact description of the invention, such as will enable others skilled in the art to which it appertains to make and use the same.

This invention relates to filters having a granular bed, and more especially to that class of devices employed therewith which are known as "cleaners;" and the object of the same is to produce a device for agitating the granular bed of the filter while passing water through it in a reverse direction in order to clean the same.

To this end the invention consists in mounting within an upright cylindrical filter-body a pair of rods carrying agitator-arms and in supporting such rods by agitating mechanism, all as hereinafter more fully described and claimed, and as illustrated in the accompanying drawings, wherein—

Figure 1 is a vertical section of a filter provided with my improved cleaner. Fig. 2 is an elevation of the cleaner proper removed and with its parts in different position from that shown in Fig. 1. Fig. 3 is a transverse section on the line 3 3 of Fig. 1.

Referring to the said drawings, the letter C designates herein an upright cylinder containing filtering material F and from which cylinder lead the pipes P, that supply the unfiltered water, take away the filtered water, and remove the impure water when the filter is cleaned, all as is usual in devices of this character. The filtering material F is generally some granular substance composed in considerable part of sand and charcoal, although I do not limit myself to the same, and it is well known that when the unfiltered water flows in at one end of the filter, passes through this material, and flows out in filtered condition at the other end of the cylinder the filtering material at the inlet end soon becomes fouled. In order to cleanse this material, it has been customary heretofore to reverse the direction of the flow of water and to divert to the sewer or other waste the impure water then flowing out of that end of the cylinder which was formerly the inlet. However, it is well known that even when this reverse movement of the clear water has been continued for a considerable time and the filtering material thoroughly washed it will yet contain a certain amount of sediment which it is found impossible to remove, because it is caught and held by the granular filtering material.

The object of the present invention is to provide an agitator located permanently within the cylinder C and adapted to be operated to stir the filtering material during the reverse flow of the filtered water, whereby the washing process will thoroughly and effectually remove all particles of dirt.

Coming now to the present invention, 1 is a rock-shaft journaled across the cylinder C in bearings 2 and having at one extremity a crank-handle 3, and 4 is a cross-bar or "walking-beam" fast upon this shaft at about the axial center of the cylinder. 5 5 are two upright rods pivoted at 6 to the extremities of this bar and preferably connected at their lower ends by pivots 7 with a knife 8, which is curved in side elevation and sharpened on its lower edge. The rods 5 are of equal length, so that the knife 8 hangs within the cylinder on a line parallel with the bar 4, and it is clear that when the latter is rocked by oscillating the shaft 1 the rods will rise and fall alternately and the knife will be rocked simultaneously with the bar. Attached to each rod is a series of arms 9, forked in plan view, deflected out of a horizontal line in side elevation, and extending radially outward a sufficient distance to stand in proximity to the inner face of the cylinder when the bar 4 is horizontal, as seen in Fig. 1, and a plan view of these arms in their preferred shape is seen in Fig. 3. When the shaft 1 is oscillated by means of the crank-handle, it will be clear that each rod and all the arms thereon will be moved upward and downward as well as inward and outward toward and from the axis of the cylinder, and if the arms 9 are shaped in side elevation as illustrated in Fig. 1 their inward and outward movement will agitate the filtering material F in addition to the agitation produced by their upward and downward movement. At the same time the rocking knife 8 will chop the filtering material near the bottom of the cylinder, and the whole device will so thoroughly stir the material that the clear water flowing through it in reverse direction will wash out practically all the impurities.

The operation of the device will be clear. The parts are of the desired sizes, proportions, and exact shapes, and they are preferably of galvanized iron in order that they shall not rust nor impart taste to the water, because they stand at all times within the filtering material while the filter is in use. While I do not at this time see the practical necessity for it, it is quite possible that this agitator can be operated during the flow of the water through the filter in a direction to produce filtration rather than or in addition to its operation during the flow of the water in a reverse direction.

What I claim as new is—

1. The herein-described agitator, comprising a substantially-horizontal rock-shaft with means at one extremity for oscillating it, a cross-bar secured upon the shaft within the inclosed casing, a pair of rods pivoted near the extremities of the bar and pendent therefrom, a pivotal connection between their lower ends, and on each rod arms rigidly secured and projecting radially outward, all as and for the purpose set forth.

2. In a filter-cleaner, the combination with the cylindrical filter-casing containing the filtering material, and means for directing the flow of water through the casing in either direction; of a rock-shaft journaled transversely through the casing near its upper end, means for oscillating this shaft, a cross-bar secured thereon at the axial center of the casing, two rods pivotally connected to the extremities of the cross-bar and pendent within the casing, and a series of arms projecting radially outward from each rod, deflected from a horizontal in side elevation, forked in plan view, and extending nearly to the inner face of said cylinder when the cross-bar stands approximately horizontal, as and for the purpose set forth.

3. In a filter-cleaner, the combination with an upright cylindrical filter-casing containing the filtering material, and means for directing the flow of water through the casing in either direction; of a rock-shaft journaled transversely through the casing near its upper end, means for oscillating this shaft, a cross-bar secured thereon at the axial center of the casing, two rods pivotally connected to the extremities of the cross-bar and pendent within the casing, a knife pivoted at its extremities to the lower ends of said rods and curved in side elevation with its lower edge sharpened, and a series of arms projecting radially outward from each rod nearly to the inner face of said cylinder when the cross-bar stands approximately horizontal, as and for the purpose set forth.

In testimony whereof I affix my signature in presence of two witnesses.

CHARLES D. DESHLER.

Witnesses:
F. K. MOYER,
A. E. STAHLER.